(12) United States Patent
Bard et al.

(10) Patent No.: US 12,637,590 B2
(45) Date of Patent: May 26, 2026

(54) ROLL OF TAPE WITH END INDICATOR

(71) Applicants: Robert Alan Bard, Barnegat, NJ (US);
Eleanor H. Bard, Barnegat, NJ (US);
Douglas Aaron Bard, Brielle, NJ (US)

(72) Inventors: Robert Alan Bard, Barnegat, NJ (US);
Eleanor H. Bard, Barnegat, NJ (US);
Douglas Aaron Bard, Brielle, NJ (US)

( * ) Notice: Subject to any disclaimer, the term of this
patent is extended or adjusted under 35
U.S.C. 154(b) by 0 days.

(21) Appl. No.: 18/831,230

(22) Filed: Oct. 2, 2024

(65) Prior Publication Data

US 2025/0257243 A1     Aug. 14, 2025

Related U.S. Application Data

(60) Provisional application No. 63/655,666, filed on Aug.
7, 2024, provisional application No. 63/629,247, filed
on Oct. 4, 2023.

(51) Int. Cl.
*C09J 7/20* (2018.01)

(52) U.S. Cl.
CPC ......... *C09J 7/203* (2018.01); *C09J 2301/122*
(2020.08); *C09J 2301/16* (2020.08); *C09J*
*2301/30* (2020.08)

(58) Field of Classification Search
CPC .. C09J 7/203; C09J 2301/122; C09J 2301/16;
C09J 2301/30; B65H 23/038; A47K
10/16; G09F 3/02; G09F 2003/0269
See application file for complete search history.

(56) References Cited

U.S. PATENT DOCUMENTS

| | | | | |
|---|---|---|---|---|
| 3,247,956 A | * | 4/1966 | Rosen ........................ | C09J 7/22 |
| | | | | 225/90 |
| 4,827,621 A | * | 5/1989 | Borsuk .............. | A47G 27/0487 |
| | | | | 33/1 G |
| 6,257,410 B1 | * | 7/2001 | Ulmann ................. | B65H 18/28 |
| | | | | 428/37 |
| 6,637,124 B2 | * | 10/2003 | Pederson ............. | G01B 3/1003 |
| | | | | 33/494 |
| 6,767,628 B1 | * | 7/2004 | Posa .......................... | C09J 7/22 |
| | | | | 428/343 |
| 9,085,718 B2 | * | 7/2015 | Schuler .................... | C09J 11/06 |
| 2005/0051261 A1 | * | 3/2005 | Albanese .................. | B32B 3/04 |
| | | | | 439/39 |
| 2011/0232560 A1 | * | 9/2011 | King .................. | B65H 35/0026 |
| | | | | 116/201 |
| 2012/0196121 A1 | * | 8/2012 | Schwietz ................... | C09J 7/38 |
| | | | | 428/354 |
| 2013/0122292 A1 | * | 5/2013 | Carrdine ................... | C09J 7/20 |
| | | | | 428/354 |

* cited by examiner

*Primary Examiner* — Patricia L. Nordmeyer
(74) *Attorney, Agent, or Firm* — Patterson + Sheridan,
LLP

(57) ABSTRACT

Fully transparent or translucent adhesive tape has been used
for many years to wrap packages. Many times following the
removal of a portion of the subject tapes from the rolls of the
subject tapes the portions of the subject tapes that have not
been removed from the subject tapes become re-attached to
the rolls of the subject tapes. When the foregoing happens it
becomes necessary that before the next use of the subject
tapes that a person be able to remove the next portion of the
subject tapes remaining on the roll of the subject tapes from
the rolls of the subject tapes. This invention, by providing a
marking system to help find the end of the subject tape
remaining on a roll of mostly transparent or mostly trans-
lucent type tape, helps to accomplish the first step in the
removal process.

16 Claims, 1 Drawing Sheet

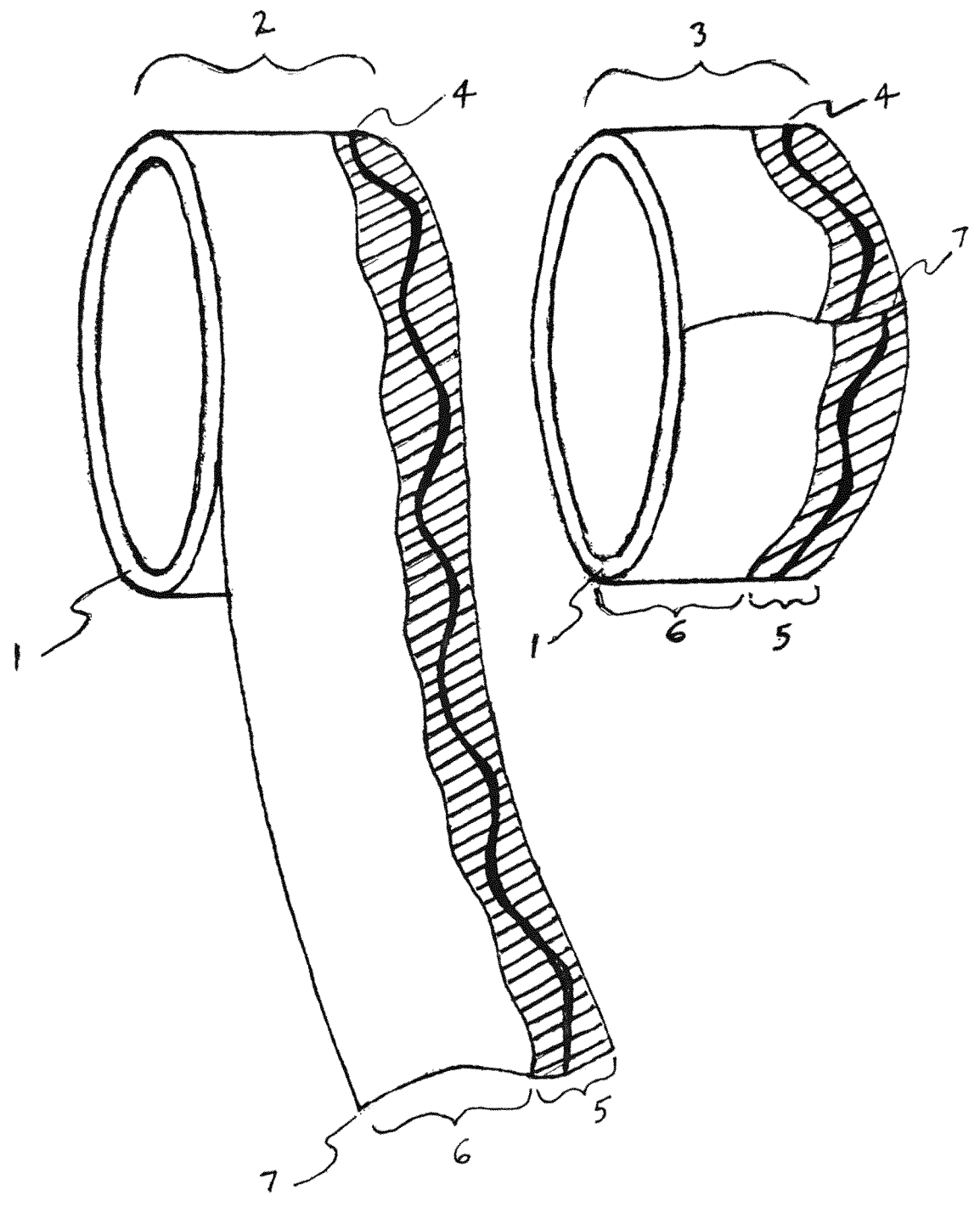

ROLL OF TAPE WITH END INDICATOR

PRIORITY AND RELATED APPLICATIONS

The present invention claims priority from the U.S. Provisional Patent Application No. 63/629,247 filed on Oct. 4, 2023 entitled A FURTHER IMPROVEMENT TO U.S. patent application Ser. Nos. 17/300,557 AND 17/300,880 BY VARYING THE WIDTH OF THE "TELLTALE" LINE ALL ALONG THE ENTIRE LENGTH OF THE "TELL-TALE" LINE and the U.S. Provisional Patent Application No. 63/655,666 filed on Aug. 7, 2024 entitled LOCATING THE ACTUAL END OF TRANSPARENT/TRANSLU-CENT ADHESIVE TAPE (T/TAT)ON A ROLL OF T/TAT FOLLOWING EACH AND EVERY REMOVAL OF T/TAT FROM HE ROLL OF T/TAT. Other than the foregoing provisional patent applications there is no evidence specifically relating to FTPAToFTLAT where there has ever been an attempt to locate the actual end of FTPAToFTLTAT remaining on/attached to a roll of FTPoFTLAT following each and every removal of a portion of T/TAT from a roll of T/TAT.

BACKGROUND OF THE INVENTION

FTPAToFTLAT has been used for many years for various purposes such as wrapping packages. In many cases, following the removal of a portion of FTPAToFTLAT from a roll of FTPAToFTLAT the end of the portion of FTPAToFT-LAT that has not been removed from the roll of FTPAToFT-LAT becomes re-attached to the roll of FTPAToFTLAT because of the adhesiveness of the FTPAToFTLAT. When the foregoing happens it becomes necessary before the next use of the FTPAToFTLAT to detach that re-attached end of the FTPAToFTLAT from the roll of FTPAToFTLAT roll of FTPatoFTLAT as easily as possible. This invention, by providing a marking system that pin points the location of the actual end of the portion of the MTPAoMTLAT that became re-attached to the roll of MTPAToMTLAT thus accomplishes the first step in the process of removing the next portion of the of the MTPAToMTLAT that previously became re-attached to the roll of MTPAToMTLAT.

SUMMARY OF THE INVENTION

As used herein, fully transparent adhesive tape or fully translucent adhesive tape is referred to as "ftpatoftlat" and mostly transparent adhesive tape or mostly translucent adhesive tape it referred to as "mtpatomtlat." This invention is the very first invention that employs a marking system that serves to locate the actual end of the MTPAToMTLAT remaining on/attached to the roll of MTPAToMTLAT following the removal of the previous portion of the MTPAToMTLAT from the roll of MTPAToMTLAT. More specifically, this invention employs a visual indicator line (VIL) that continually varies in width separate from the VIL continuously varying in position relative to the sides of the MTPAToMTLAT all along the entire length of the MTPAToMTLAT with the result being that, statistically, the chance that the VIL on the outermost layer of the MTPAToMTLAT will match/align with the VIL on the layer of the MTPAToMTLAT immediately below the outermost layer of the MTPAToMTLAT will be extremely remote thus locating points on the tear line of the MTPAToMTLAT to in turn enable the start of the peeling off process to remove additional portions of the MTPAToMTLAT for activities such as the packing up boxes of items. Additionally, in concert with the foregoing, the V L continually varies in position within the confines of an opaque colored band (OCB) that has one side coincident with the side of the MTPAToMTLAT such that both the VIL and the OCB in which the VIL is located are positioned all along the entire length of the MTPAToMTLAT. Furthermore, the width of the OCB itself also continually varies all along the entire length of the MTPAToMLTAT. Of course, the side of the OCB which is not coincident with the side of the MTPAToMTLAT can also be non-varying in its position on the MTPAToMTLAT along the entire length of the MTPAToMTLAT. The combination of all of the foregoing design features statistically insures that there will continually be a misalignment between what is showing on the outermost layer of the MTPAToMTLAT and what is showing on the layer of the MTPAToMTLAT that lies immediately below the outermost layer of the MTPAToMTLAT such that, again where the foregoing misalignment occurs locates points on the tear line of the MTPAToMTLAT thus serving to guide a person towards the tear line which helps to overcome the personal frustration, wasted material and wasted time associated with attempting to first locate the tear line which is necessary before being able to remove additional portions of the MTPAToMTLAT from the roll of MTPAToMTLAT.

BRIEF DESCRIPTION OF THE DRAWING

FIG. 1 shows two views of rolls of MTPAToMTLAT (!) one view (2) where a portion of the MTPAToMTLAT (1) is partially unfurled from the roll of MTPAToMTLAT (1) and the other view (3) with that same portion of the MTPAToMTLAT (1) that was previously unfurled from the roll of MTPAToMTLAT (1) now re-attached to the roll of MTPAToMTLAT (1). View (2) shows a single VIL (4) whereas view (3) appears to show that what in actual reality is a single VIL (4) now appearing to be the misaligned ends of two separate lines with both lines continuing to be varying in position on the MTPAToMTLAT (1) as well as continuing to be varying in width along the entire length of the MTPAToMTLAT (1). Also, the VIL (4) continues to be located within the continuing variable width of the OCB (5) (shown as hatched) on the roll of MTPAToMTLAT (1). The fully transparent or translucent part of the invention is identified as (6). All of the foregoing has occurred as a result of the above mentioned variations combined with the physical tearing of the MTPAToMTLAT (1) which has also caused the end of the both of the two lines as well as parts of the OCB (5) to lie on the tear line (7). Of course, the side of the OCB (5) which is not coincident with the side of the MTPAToMTLAT (1) can also be non-varying in its position on the MTPAToMTLAT (1) along the entire length of the MTPAToMTLAT (1).

DETAILED DESCRIPTION OF THE INVENTION

As shown in FIG. 1 this invention employs a VIL (4) that is a line that continuously varies in width separate from continuously varying in position relative to the sides of the MTPAToMTLAT (1) and extending the entire length of the MTPAToMTLAT (1) in addition to the fact that the VIL (4) is also located within an OCB (5) one side of which is coincident with one side edge of the MTPAToMTLAT (1) with OCB (5) also having a width that is continuously varying along the entire length of the MTPAToMTLAT (1). Of course, the side of the OCB (5) which is not coincide, t with the side of the MTPAToMTLAT (1) can also be non-varying in its position on the MTPAToMTLAT (1) along the entire length of the MTPAToMTLAT (1). The OCB (5) Is planned, in actuality, to be a lighter color than the VIL (4) which will also be shown in a darker color in order to contrast the VIL (4) from the color of the OCB (5). The OCB (5) itself, will be dark enough in color to mostly obscure the portion of the OCB (5) underlying the outermost layer of the MTPAToMTLAT (1) as well as the VIL (4) lying within the underlying OCB (5). The foregoing is at the heart of the invention as follows: the invention's continuous variable positioning of the VIL (4) relative to the sides of the MTPAToMTLAT (1) combined with the invention's continuous variable width of the VIL (4) has caused what appears to be not only the ends of two separate VILs (4) misaligned with each other as well as at the same time what appears to be the ends of two separate VILs (4) having two different widths. In actuality, only one of the two VILs (4) has its actual end showing. The false appearance of the end of the other VIL (4) is basically an illusion, however, it is the combination of the occurrence of the misalignment of the two VILs (4) along with the difference in the widths of the two VILs (4) that yields the fact that both the actual end of the VIL (4) as well as the illusionary end of the VIL (4) lie on the actual tear line (7) of the MTPAToMTLAT (1) because the tear itself, has caused what is happening relative to the VIL (4) and thus yielding where to initiate the process of the rem val of the next portion of the MTPAToMTLAT (1) from the roll of MTPAToMTLAT (1). Bottom line: it is the tear itself combined with the foregoing variables that are basic to the invention.

Additionally, the invention has been specifically designed to have the VIL (4) located within the OCB (5) which, in turn, also has specifically been designed to have one of the OCB's (5) sides coincident with the side edge of the MTPAToMTLAT (1). for the following reason: it is well known that the locations on the MTPAToMTLAT (1) where it is the easiest to peel off portions of the MTPAToMTLAT (1) from the roll of MTPAToMTLAT (1) is at the side edges of the MTPAToMTLAT (1) because at the side edges of the MTPAToMTLAT (1) the resistive adhesive forces only exist on one side of the item attempting to remove a portion of the MTPAToMTLAT (1) from the roll of MTPAToMTLAT (1) versus at all other areas of the MTPAToMTLAT (1) being where the resistive adhesive forces exist on both sides of the item which is attempting to remove a portion of the MTPAToMTLAT (1) from a roll of MTPAToMTLAT (1). In other words, other than at the side edges of the MTPAToMT-LAT, (1) the resistance forces to the removal of a portion of the MtPAToMTLAT (1) from the roll of MTPAToMTLAT (1) are double the resistance for side edges of the MtPAToMtLAT (1). Furthermore, with the side edge of the OCB (5) being coincident with the side edge of the MTPAToMTLAT (1) and with the VIL (4) lying within the OCB (5) consequently the VIL (4) remains generally cl se to the side edge of the MTPAToMTLAT (1), thus making it easier to align the real and virtual breaks, both of which lie on the actual tear line (7) to optimally, be at a location close to the side edge of the MTPAToMTLAT (1) which in view of the foregoing, is the best location for initiating the peeling process, that location being at the point where the tear intersects the side edge of the MTPAToMTLAT (1) as previously mentioned.

Also incorporated in the design of this invention, is the option to have the side of the OCB (5) that continuously varies in distance from the fixed side of the MTPAToMT-LAT (1) be perforated and thus able to be detached from the fully transparent or translucent portion of the MTPAToMT-LAT (1) after the marking system has been employed to locate where the tear is located, if there is a need f r the MTPAToMTLAT (1) to be fully transparent or fully translucent.

It is also worth noting that, although a continuous VIL (4) is necessary/optimal for locating the tear, it is possible to have unplanned/unintentional breaks or gaps in the VIL (4) throughout the roll of MTPAToMTLAT (1) thus creating a distraction as well as a loss of time in the search for the true end of the MTPAToMTLAT (1) because of the resultant "false" tear points. The foregoing has been herein addressed to hopefully prevent a less accurate solution from being patented and marketed. In addition, it should also be noted that the OCB (5) can provide an effective way to frame writing and/or labels when taping a package thus creating a very significantly noticeable border.

The invention claimed is:

1. A roll of tape comprising:
- a first strip extending a full length of the roll of tape, the first strip being one of translucent or transparent, the first strip comprising a first portion of a width of the tape;
- a second strip comprising a second portion of the width of the tape, the second strip disposed laterally adjacent to the first strip and extending the full length of the roll of tape, the second strip comprising an opaque region that contrasts visually from the first strip; and
- a visual indicator line disposed in the opaque region, wherein the opaque region obscures portions of the visual indicator line that underly the opaque region on the roll of tape, the visual indicator line continually varying in distance relative to a side of the tape, the visual indicator line continually varying in width.

2. The roll of tape of claim 1, wherein the opaque region varies in distance relative to the side of the tape.

3. The roll of tape of claim 1, wherein the opaque region is lighter than the visual indicator line.

4. The roll of tape of claim 3, wherein the opaque region varies in distance relative to the side of the tape.

5. The roll of tape of claim 1, wherein the second strip is separated from the first strip by a perforation that allows the second strip to be separated from the first strip.

6. A roll of tape comprising:
- a first strip extending a full length of the roll of tape, the first strip being one of translucent or transparent, the first strip comprising a first portion of a width of the tape;
- a second strip comprising a second portion of the width of the tape, the second strip disposed laterally adjacent to the first strip and extending the full length of the roll of tape, the second strip comprising an opaque region bounded by a side of the tape, the opaque region darker than the first strip; and
- a visual indicator line disposed in the opaque region, wherein exposed portions of the opaque region that reside on an exterior of the roll obscures underlying portions of the visual indicator line that underly the exposed portions of the opaque region, the visual indicator line continually varying in distance relative to a side of the tape, the visual indicator line continually varying in width.

7. The roll of tape of claim 6, wherein the opaque region varies in distance relative to the side of the tape.

8. The roll of tape of claim 6, wherein the opaque region is lighter than the visual indicator line.

9. The roll of tape of claim 6, wherein the second strip is separated from the first strip by a perforation that allows the second strip to be separated from the first strip.

10. A roll of tape comprising:

tape wound in a roll, the tape having a first side, a second side and an exposed end;

a visual indicator line disposed along a full length of the tape, the visual indicator line continually varying in distance relative to the second side of the tape, the visual indicator line continually varying in width, wherein at least one of a distance of the visual indicator line from the second side of the tape and a width of the visual indicator line at the exposed end is different than a distance of the visual indicator line from the second side and a width of the visual indicator line at a portion of the tape extending out from under the end of the tape;

at least a first portion of the tape adjacent to the visual indicator line is one of translucent or transparent, the first portion running a full length of the tape; and a second portion disposed adjacent to the second side and containing the visual indicator line, the second portion being opaque and running the full length of the tape, the first and second portions comprising at least a portion of a width of the tape.

11. The roll of tape of claim 10, wherein both the distance of the visual indicator line from the second side of the tape and the width of the visual indicator line at the exposed end are different than the distance of the visual indicator line from the second side and the width of the visual indicator line at the portion of the tape extending out from under the end of the tape.

12. The roll of tape of claim 10, wherein the second portion is contrasting to the first portion.

13. The roll of tape of claim 10, wherein the tape further comprises:

a perforation separating the first portion of the tape from the second portion of the tape.

14. The roll of tape of claim 10, wherein the opaque second portion containing the visual indicator line varies in distance relative to the side of the tape.

15. The roll of tape of claim 14, wherein the opaque second portion is lighter than the visual indicator line.

16. The roll of tape of claim 15, wherein an exposed portion of the opaque second portion obscures covered portions of the opaque second portion that underlie the exposed portion on the roll of tape.

* * * * *